United States Patent [19]
Miller et al.

[11] Patent Number: 5,560,952
[45] Date of Patent: Oct. 1, 1996

[54] PROCESS FOR CONTINUOUSLY COOKING FOOD

[76] Inventors: R. Craig Miller, 15160 Desman Rd., La Mirada, Calif. 90638; Richard W. Naess, 22601 Allview Ter., Laguna Beach, Calif. 92651

[21] Appl. No.: 494,716

[22] Filed: Jun. 26, 1995

Related U.S. Application Data

[62] Division of Ser. No. 394,194, Feb. 24, 1995, abandoned, which is a continuation of Ser. No. 92,755, Oct. 2, 1992, abandoned.

[51] Int. Cl.$^6$ ........................................ A23L 1/00
[52] U.S. Cl. ........................................ 426/510; 426/523
[58] Field of Search ........................... 426/523, 510, 426/511, 520; 99/386, 391, 443 C

[56] References Cited

U.S. PATENT DOCUMENTS

| | | | |
|---|---|---|---|
| 4,055,677 | 10/1977 | White | 426/523 |
| 4,563,945 | 1/1986 | Hwang | 426/510 |
| 5,075,120 | 12/1991 | Leary et al. | 426/523 |

Primary Examiner—George Yeung
Attorney, Agent, or Firm—Edgar W. Averill, Jr.

[57] ABSTRACT

An improved convection/impingement oven for continuously cooking food. The oven has a wire link type belt which moves through an elongated cooking chamber. Hot air is blown on the upper surface of the food to be cooked. A separately controlled hot air source is blown on the lower surface of the food. Hot air impingement units are placed along the length of the oven and the cooking vapors are not recirculated but instead pass along the elongated cooking chamber and are exhausted at the end. Preferably a color development and sealing section has upper and lower burners which heat the food and the heat from these burners also pass the entire length of the cooking chamber before being exhausted. Also preferably steam or a water spray is used to regulate the humidity and this may be regulated in several different sections of the cooking chamber.

3 Claims, 8 Drawing Sheets

PROCESS FOR CONTINUOUSLY COOKING FOOD

This is a divisional of application Ser. No. 08/394,194 filed on Feb. 24, 1995, now abandoned, which is a continuation of application Ser. No. 08/092,755 filed on Oct. 2, 1992, now abandoned.

BACKGROUND OF THE DISCLOSURE

The field of the invention is cooking ovens and the invention relates more particularly to ovens of the type used to commercially bake, broil or otherwise cook meats, baked goods and other foods. With the increased use of frozen dinners, the moisture content in the meat contained in a frozen dinner has become more critical. Since microwave cooking tends to heat water, it is important that sufficient water be retained in the meat so that after it is microwaved it has the desired flavor and texture.

Many patents have been granted on continuous cooking ovens. For instance the Straub U.S. Pat. No. 3,604,336 shows a moving belt with upper and lower burners, a center exhaust duct is provided and no provision is made for moisture control of the finished product.

The Szabrak et al U.S. Pat. No. 3,721,178 also uses many burners along the length of the oven. The Nerthling U.S. Pat. No. 3,823,660 utilizes a continuous moving belt with radiant heaters above and below the food to be cooked. Burners are also used and the exhaust vent is positioned along one side of the entire length of the oven.

The Fagerstrom et al patent shows an electrical heating device over which air is passed after which it passes through channels above and below the product to be cooked. The cooking vapors are vented at points along the oven. The Caridis et al U.S. Pat. No. 3,947,241 shows a recirculating oven wherein a flame is fed into an upper chamber and then passes in a u-shaped path into the lower chamber where the product to be cooked is located. A certain mount of cooking vapors is exhausted at both ends of the oven.

A charmaker is shown in the Fetzer U.S. Pat. No. 4,026,201 which uses many rings which are heated and ride on the upper surface of the food product. The Baker et al U.S. Pat. No. 4,121,509 utilizes electric heating elements and recirculated air which passes through tubes at the end of the oven and flows against the upper and lower surface of the food to be cooked.

The Caddis et al U.S. Pat. No. 4,167,585 is similar in structure to U.S. Pat. No. 3,947,241 and is basically a recirculation system wherein water vapor is injected into the moving stream of process vapor to control the temperature and moisture content.

The Benson et al U.S. Pat. No. 4,297,942 shows a branding process utilizing an oversized screen with upper and lower burners, the heat from which is exhausted from the branding unit. The Baker U.S. Pat. No. 4,936,286 is a small continuous broiler which has three side-by-side conveyors. The Lear, et al U.S. Pat. No. 4,949,629 is a continuous cooking oven which has two very separate cooking zones, both zones utilize recirculation of the cooking vapors. Lastly, the Barkhau et al U.S. Pat. No. 4,991,497 cooks food in a closed bottom tray and utilizes air high velocity impingement nozzles to accomplish the cooking. The air is recirculated.

Although one would think that recirculation of cooking vapor would result in an efficient unit, this is not the case. Since ovens must be constructed in a manner so that they can be easily and completely cleaned, it is not practical to place an outer layer of insulation on the oven. Therefore, the large additional surface area that is required to bring about recirculation radiates more than the amount of heat saved in recirculation. Furthermore, for some products such as pork, the recirculation process results in an undesirable pink color in the meat even though it is completely cooked. Therefore, an oven which is more efficient in the use of heat would be highly desirable. Still further, it is useful to be able to cook various different types of food products requiring a wide range of controls for heat temperature and humidity.

SUMMARY OF THE INVENTION

The present invention is for an improved convection/impingement oven for continuously cooking food. The oven is of the type having a pervious, continuous, moving belt which has an upper product supporting surface referred to as a "food supporting belt" and a return belt portion. The food supporting belt has a lower surface which permits the passage of hot air or other vapors upwardly therethrough and the passage of fat or other drippings downwardly therethrough. The food passes from a product feed end to a product discharge end through a closed elongated cooking chamber which is enclosed by a top, two sides, and a bottom. The food supporting belt and the return belt both pass through this chamber. A burner blower is supplied with outside air and feeds air to at least one burner which feeds hot air to a first manifold which is at about atmospheric pressure and has an air intake which permits atmospheric air to enter from outside the oven. A second blower then takes the atmospheric pressure hot air and increases the pressure thereof for later feeding into a low pressure, hot-air manifold and from there through air impingement nozzles onto the food to be cooked. A plurality of upper air impingement nozzles are positioned above the food supporting belt and these nozzles are fed from an upper air impingement manifold which in turn is supplied from the said low pressure hot air manifold. A plurality of lower air impingement nozzles are positioned below the lower surface of the food supporting belt, and this is fed from a lower air impingement manifold which in turn is fed by the low pressure hot air manifold. Means are provided for independently controlling the flow of hot air to the upper air impingement manifold and to the lower air impingement manifold. A cooking vapor vent having an inlet positioned adjacent the product discharge of the cooking chamber comprises the only outlet for the cooking vapors. The cooking vapors move along the cooking chamber and hot air is introduced along the length of the chamber thereby causing the hot air flow, concurrently with the food-supporting surface, to move at an ever increasing rate along the cooking oven. Preferably the lower hot air impingement units and the upper hot air impingement units are fed by separate burners and blowers. Also preferably a color development and sealing unit is positioned at the product feed end of the cooking chamber and upper and lower burners are played upon the food to be cooked (and preferably a branding wheel) and the heat from these two burners is passed the entire length of the cooking chamber. The color development and sealing burners are adjustable so that the direction of the flame may made from horizontal to directly downwardly. It is also preferable that a plurality of steam nozzle assemblies are positioned along the cooking chamber, preferably between the impingement units. Also, preferably the steam nozzles are separated into several discreet groups which are independently controllable so that different zones of the oven can be of different humidity and/or temperature.

The present invention is also for a process of cooking food comprising the steps of placing an object to be cooked on the upper surface of a perforate moving belt. Next, a color development and sealing flame is aimed so that the heat therefrom passes into the entrance of an elongated cooking chamber. Steam may next be introduced above and below the object to be cooked and hot air is impinged on the upper and lower surface with the temperature and force of the impinging stream of hot air from the upper nozzles being independently controlled from that from the lower nozzles. The object to be cooked is passed through at least one set of upper and lower air impingement nozzles and upper and lower steam nozzles and the finally cooked product is removed at the product discharge end.

BRIEF DESCRIPTION OF THE DRAWINGS

FIG. 3A is an enlarged view taken along line 3A of FIG. 3.

FIG. 7 is a front view of the control panel of the cooking unit of FIG. 1.

DESCRIPTION OF THE PREFERRED EMBODIMENTS

Figure 1:
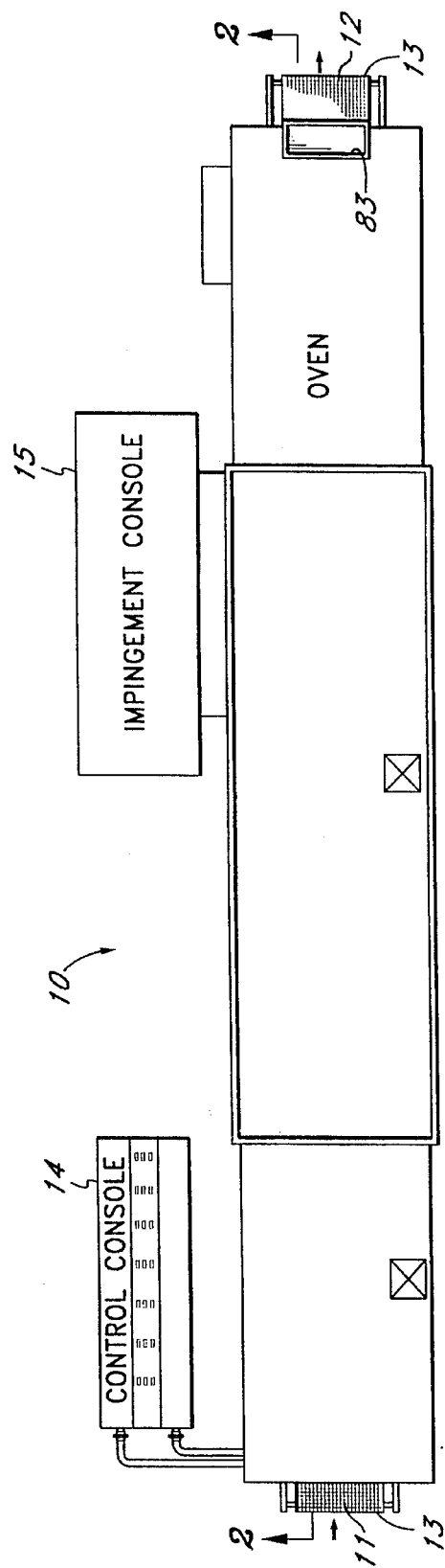
FIG. 1 is a plan view of the improved convection/impingement cooking oven of the present invention.
Figure 2:
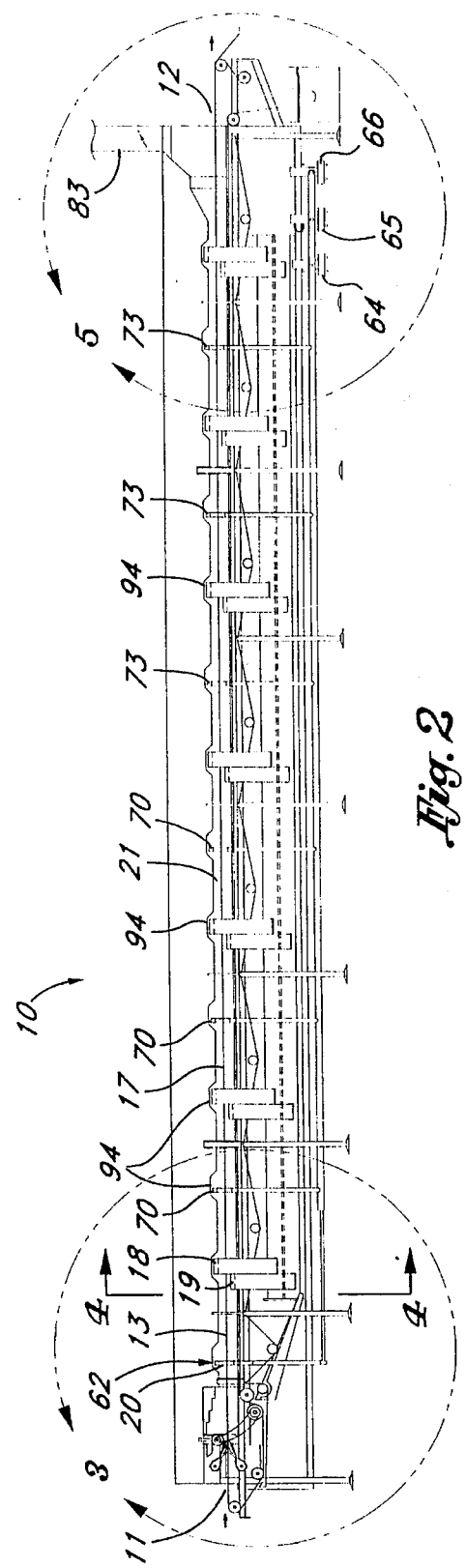
FIG. 2 is a cross sectional view taken along line 2—2 of FIG. 1.
Figure 9:
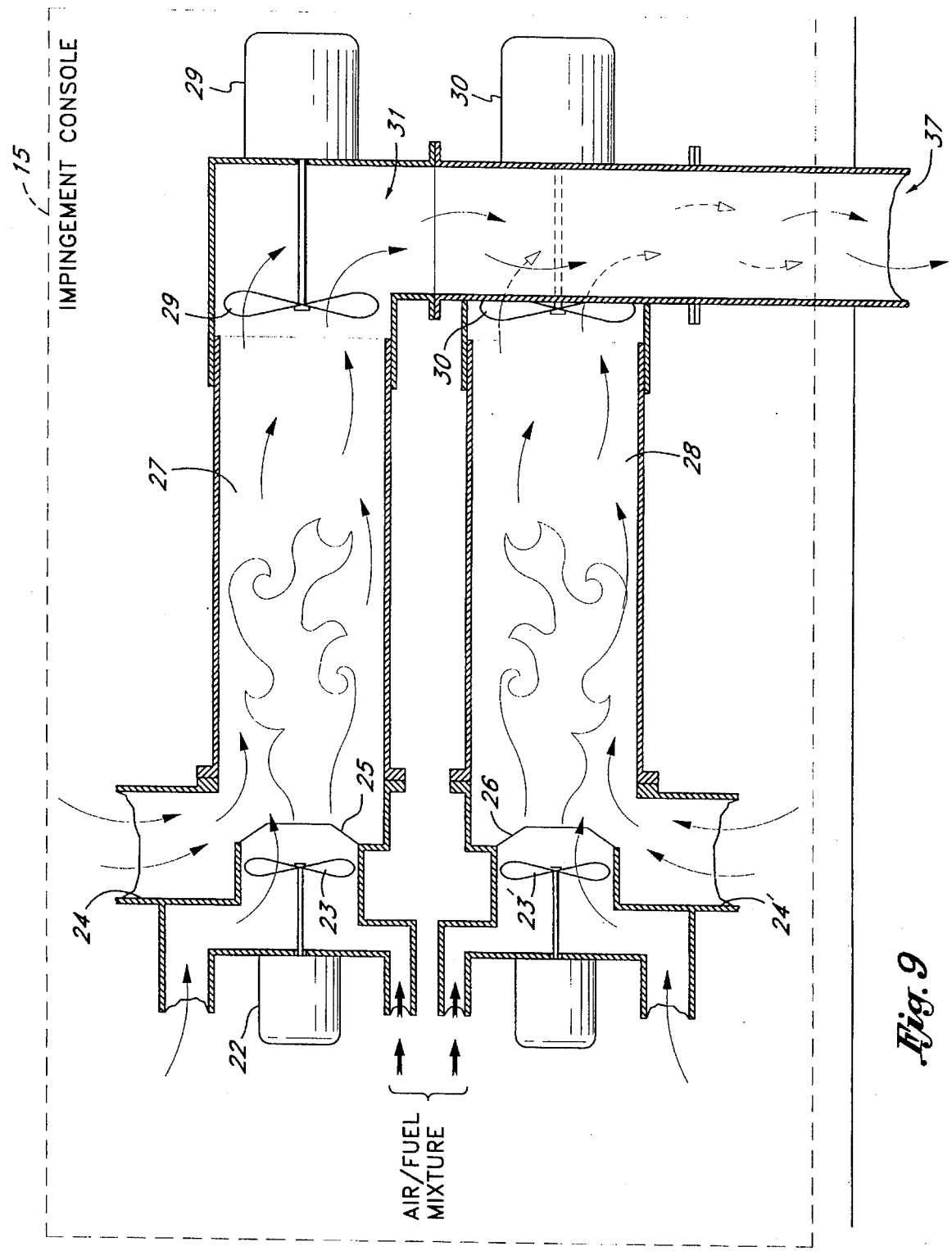
FIG. 9 is n enlarged plan view of the impingement console unit of FIG. 1.

The improved convection/impingement oven of the present invention is shown in FIGS. 1 and 2 and indicated by reference character 10. Oven 10 has a product feed end 11 and a product discharge end 12. The food to be cooked is placed on a pervious, continuous, moving belt 13 which is fabricated from a plurality of linked rods, of steel or other construction known in the art. The unit is operated from a control counsel 14, and an impingement console 15 contains the burners for feeding the air impingement unit. Details of the impingement console are shown in FIG. 9.

Figure 3:
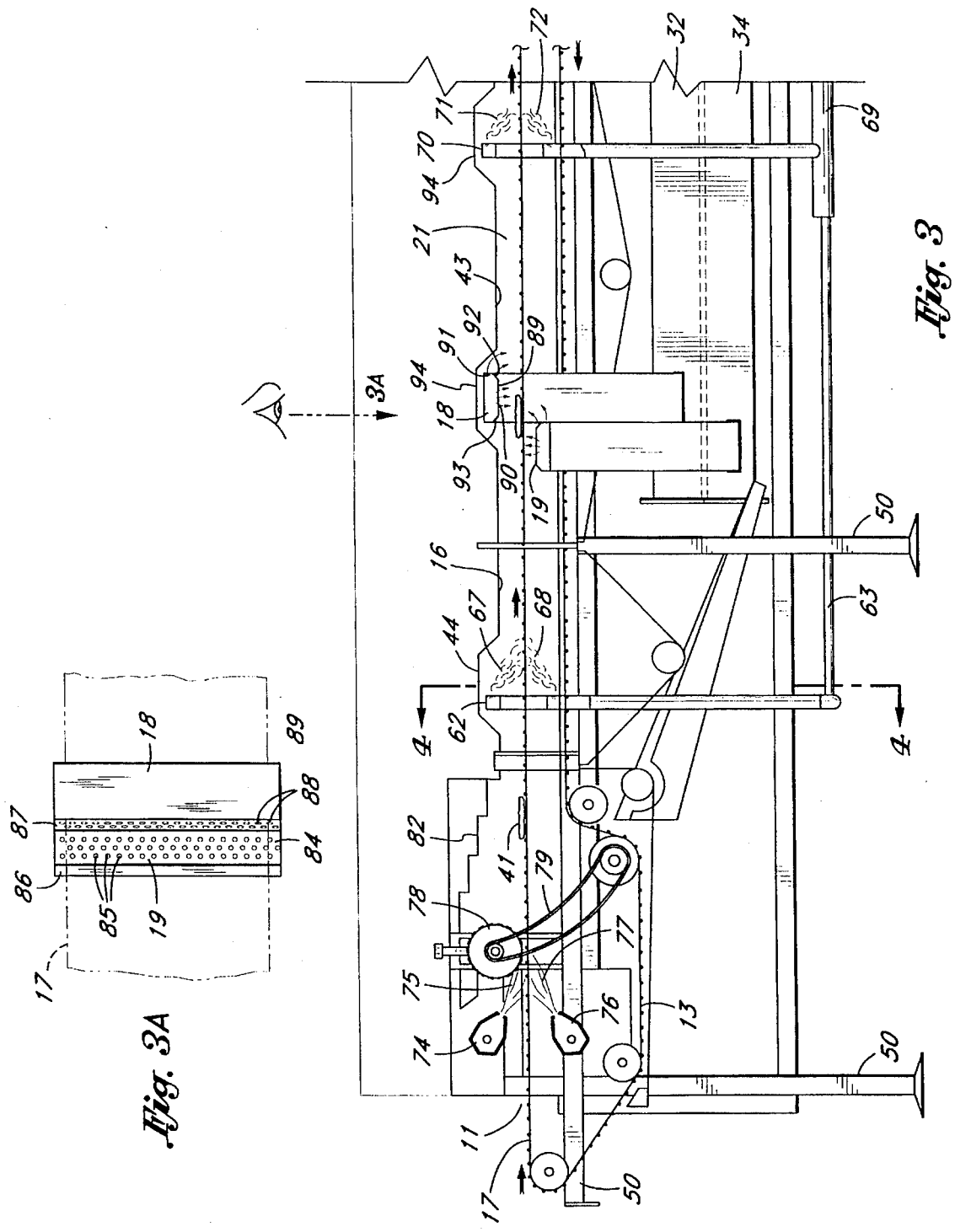
FIG. 3 is an enlarged cross sectional view of the product feed end of the oven of FIG. 1 including the color development and sealing assembly, a steam nozzle assembly, and a hot air impingement assembly.
Figure 4:
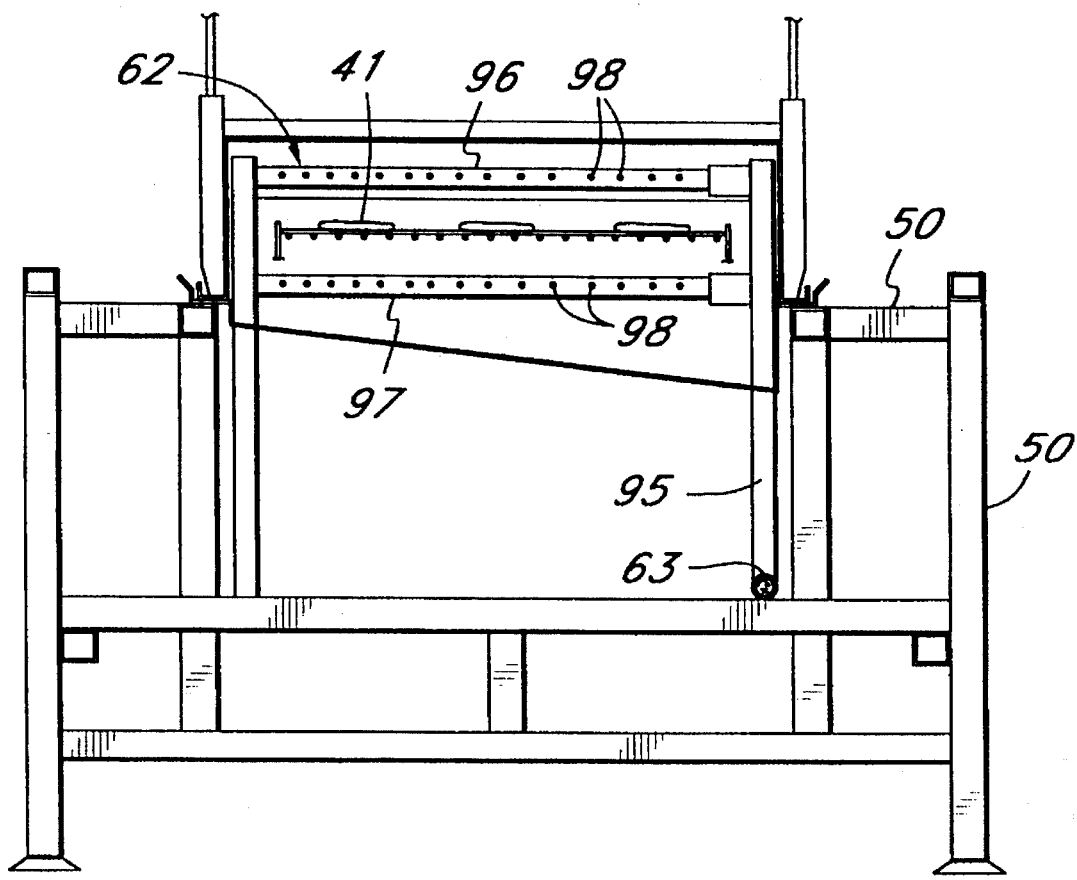
FIG. 4 is a cross sectional view taken along line 4—4 of FIG. 3.

A cross sectional view of oven 10 is shown in FIG. 2 where it can be seen that the upper part of belt 13 moves from left to right as shown in FIG. 2 and passes through an elongated cooking chamber which is shown more clearly in FIGS. 3 and 4, where it is moving portion 17 of the belt 13, (the forward moving portion 17 is called the "food supporting belt") upper and lower air impingement nozzles such as those indicated in FIG. 2 by reference characters 18 and 19 pass hot air onto the upper and lower surface of the product to be cooked. Also, steam nozzles assemblies such as indicated in FIG. 2 by reference characters 62, 70, and 73 pass steam or water vapor into the cooking vapor 21 which forms above and below the food to be cooked.

The essential feature of the present invention is the ability to separately control both the temperature and volume emitted from the upper and lower air impingement nozzles in the oven. As shown in FIG. 9, a blower assembly 22 feeds air and fuel to a burner nozzle 25. Burner nozzle 25 forms a flame which heats the air in the interior of manifold 27. The interior of manifold 27 is at about atmospheric pressure and draws air as needed through conduit 24 which is open to the exterior of the oven. Conduit 24 does not draw any recirculated hot air from vent 83. Similarly, a lower blower assembly feeds air and fuel to a burner nozzle 26. Burner nozzle 26 forms a flame which heats the air in manifold 28. The hot air in manifold 28 is at about atmospheric pressure and draws air as needed through conduit 24' which also is drawn from outside the oven. The hot air at atmospheric pressure in manifold 27 is fed to a blower assembly 29 which increases its pressure to from one-half to ten psig. As blower assembly 29 requires more hot air, above that required to simply move the gasses exiting nozzle 25, it is supplied by the air stream entering conduit 24 so it never has a negative feed pressure. Blower assembly 29 feeds the hot air into a hot air conduit 31 from which it passes into the upper hot air manifold 32 shown in FIGS. 3, 5, and 6. Blower assembly 30 feeds hot air from manifold 28 to lower hot air conduit 33 (which is directly below conduit 31 in FIG. 9) from which it passes into lower hot air manifold 34. Both the burner assembly 22/23/25 and 23'/26 and the blower assemblies 29 and 30 may be independently controlled so that the temperature as well as the air pressure may be set to a preferred level for the product to be cooked.

Figure 6:
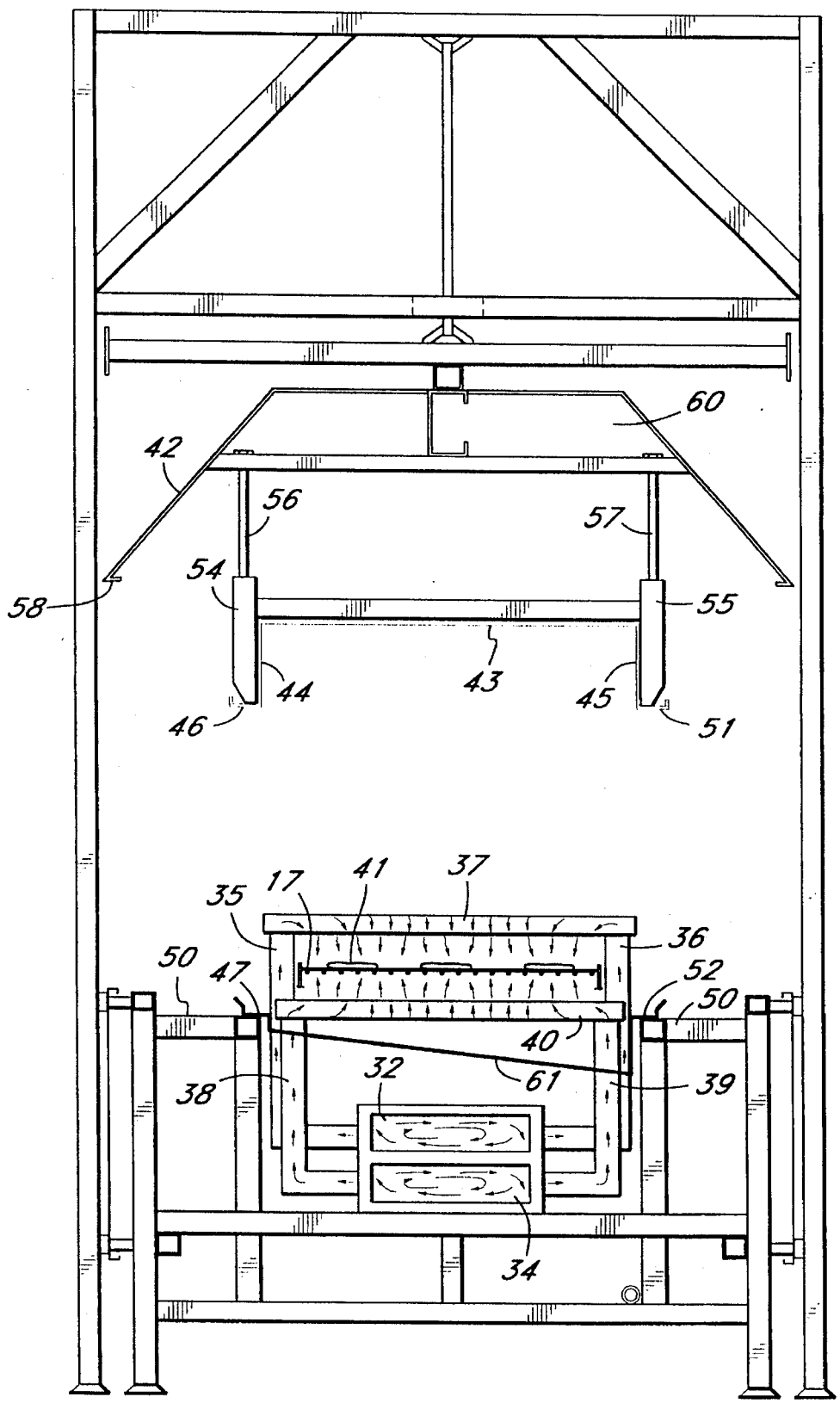
FIG. 6 is a cross sectional end view showing the oven of FIG. 1 with the hood thereof raised.
Figure 2:
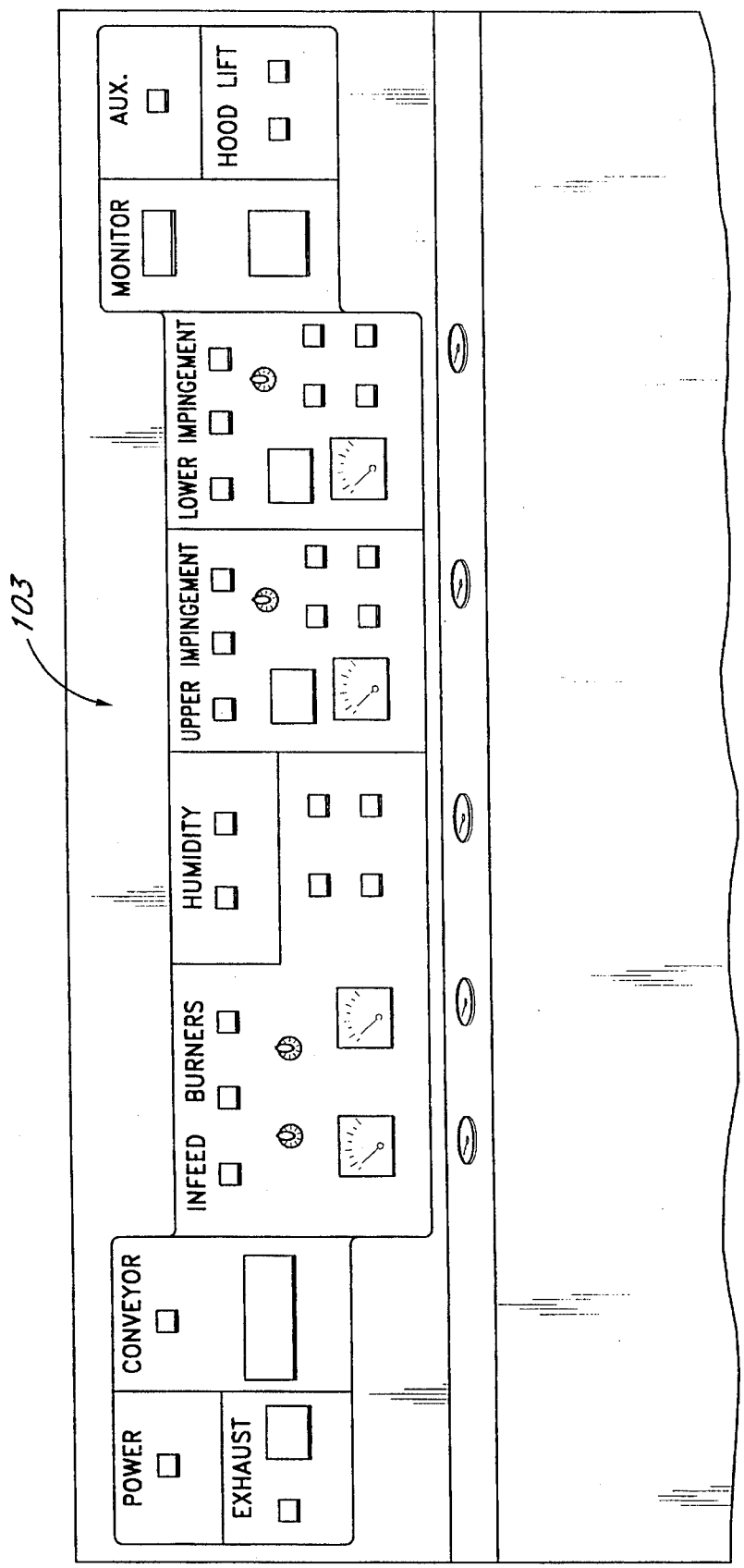

Turning now to FIGS. 3 and 6, the lower hot air manifold 34 feeds hot air into right and left hot air channels 38 and 39 which feed a lower air impingement nozzle assembly 19. Air under a relatively low pressure (one-half to ten pounds per square inch gauge) passes outwardly through upwardly directed holes 85 (see FIG. 3A) in the plates of the nozzle and impinges upon the food to be cooked. Hot air also passes outwardly through holes 88 in an angled plate 87 which directs hot air both downwardly and toward vent 83 down the oven chamber. Similarly, holes in nozzle assembly 18, fed by channels 35 and 36, urge hot air downwardly and forwardly to impinge the food and to help urge the gas flow down the oven chamber to the vent 83. This not only heats the food by conduction but also tends to remove any stagnant air and vapor layer which surrounds the food. Thus, the food is heated more efficiently and more quickly by the fact of the air impingement. It further carries with it the surrounding cooking vapor with its temperature and humidity so that the food is more quickly raised to the desired temperature. Since the food supporting belt 17 is largely open, the hot air passes readily through it and around all sides of the food to be cooked (which is indicated by reference character 41 in FIG. 6).

The surfaces of the cooking chamber are shown in FIG. 6 although the hood 42 has been raised therefrom. The upper wall of the cooking chambers indicated by reference character 43 and the left side wall by 44 and the fight side wall by 45. The base portions 46 and 51 rest in the sealing lips 47 and 52 of the lower pan 61 when the hood is lowered. The hood consisting of walls 43, 44 and 45 are held on a cross member 53 which is, in turn, held by two vertical members 54 and 55. Members 54 and 55 are supported by rods 56 and 57. The hood is raised and lowered by a chain hoist 40 supported by frame 50. Rods 56 and 57 telescope into vertical members 54 and 55 so that as hood 42 is lowered, the base 58 thereof rests upon the frame to create a dead air space 60 above the upper surface and the side walls of the cooking chamber. The lower pan of the cooking chamber is indicated by reference character 61 which provides a conventional slanted grease or other liquid removing floor. It is important that the air volume of the cooking chamber be relatively small so that only the air necessary for cooking need be heated and the outer surface of the cooking chamber be minimized to minimize radiation heat loss. Outer sides are, of course, provided along the entire length of the oven to further reduce heat loss.

Returning now to FIGS. 3 and 4, a steam nozzle assembly 62 is shown in side view in FIG. 3 and in front view of FIG. 4. A steam line 63 is controlled by a steam valve 64 shown in FIG. 2. This is independently controlled from steam valves 65 and 66 which provides the operator with additional temperature and moisture control. It is, of course, understood that the term "steam" is intended to include a spray of water mist which is quickly turned to steam in the high temperatures of the cooking chamber. Returning to FIG. 3 steam nozzle assembly 62 emits an upper stream of steam 67 and a lower stream of steam 68 through nozzles 20. Since the product to be cooked has just passed through a high temperature color development and sealing operation, the streams of steam 67 and 68 tend to extinguish any flareup that may occur. Also, it should be noted that the streams 67 and 68 are directed toward the discharge end 12 of the oven which helps move the cooking vapor 21 concurrently with respect to the food supporting belt 17. A separate steam line 69 supplies a steam nozzle assembly 70 which also has a pair of streams of steam 71 and 72. Steam nozzle assembly 70 is controlled by steam valve 65 as are the other steam nozzle assemblies indicated by reference character 70 in FIG. 2. Steam nozzle assemblies 73 shown in FIG. 2 are controlled by steam valve 66.

Turning now to the color development and sealing assembly, an upper color development and sealing burner 74 (see FIG. 3) is fed with high pressure air and gas to provide a flame 75 which heats the upper surface of food 41 to be cooked. This provides coloring and sealing to the food. Similarly, a lower color development and sealing burner 76 has a flame 77 which heats the lower surface of food product 41. The heat from both the upper and lower flames 75 and 77 heat a branding wheel 78 which is driven by a chain link belt 79 from a gear 80 which also contacts the continuous moving belt 13. Branding wheel 78 is floating so that it will rise if necessary. Branding wheel 78 may also be permanently raised to eliminate any branding. The branding rods 81 always move at the same speed as a food supporting belt 17 to provide a neat brand on the upper surface of food product 41. The lower side of the food product 41 is branded by the moving belt 13, although belt 13 may be cooled to eliminate branding if desired.

Burners 74 and 76 may be aimed through a 90 degree arc. They may be aimed horizontally toward the cooking chamber or at any angle between horizontally to directly downwardly and upwardly respectively toward the moving belt 17. The choice of direction depends on the amount of coloring and sealing desired and the type of food being cooked. Thus the flames 75 and/or 77 may be aimed to directly impinge the surfaces of the food to be cooked, or they may merely heat the surfaces depending on how the burners 74 and 76 are aimed.

An important feature of the color development and sealing assembly is the aiming of the flames 75 and 77 toward the opening of the cooking chamber and the conveying of the heat from these flames into the cooking chamber. The portion of the cooking chamber which surrounds the branding rods is in a stair stepped shape indicated by reference character 82. The hot air is moved inwardly into the cooking chamber and not exhausted in a separate vent. The hot air carries the entire length of the cooking chamber and is not vented until it passes out of the cooking vapor vent 83 shown in FIGS. 1 and 2. Also the upper color development and sealing burner and the lower color development and sealing burner are independently controlled so that the proper amount of heat may be applied depending on the product being cooked.

The construction of the upper and lower impingement manifolds is a very important feature of the present invention. FIG. 3a shows the top of lower and upper air impingement manifolds 19 and 18 where it an be seen that nozzle 19 has a nozzle plate 84 with a plurality of small holes 85 which causes the air to move out in small discrete streams against the product to be cooked. There are no nozzles on the angled face 86 but there are nozzles on the angled face 87 which are indicated by reference character 88. Similarly upper air impingement manifold 18 has a nozzle plate 89 shown in FIG. 3 in side view which also has a plurality of holes 90. An angled face 91 also has a plurality of holes 92 but angled face 93 has no holes. This causes the air to be urged downwardly and also at a approximately 45 degree angle in the direction of the discharge and to help move the cooking vapors 21 along the oven. It is also evident in FIG. 3 that the upper surface 43 of cooking chamber 16 is angled upwardly as indicated by reference character 94 to accommodate the air impingement manifolds as well as the steam manifolds. This causes the internal volume of the cooking chamber to be minimized and helps to increase the velocity of the cooking vapor 21 concurrently with the food supporting belts 17.

Also viewing FIG. 2 it is evident to see that with the multiple entries of hot air and steam the volume of cooking vapors increases along the chamber so that as the food becomes more cooked, the cooking vapor 21 increases in velocity.

Further details of construction of the steam nozzle assembly is shown in FIG. 4 where it can be seen that steam line 63 feeds a vertical steam line 95. This, in turn, feeds an upper horizontal steam manifold 96 and a lower horizontal steam manifold 97. Each of these manifolds have a plurality of individual nozzles 20 which urge the streams of steam in the direction shown for instance, in FIG. 3 indicated by reference character 67 and 68.

Another important feature of the present invention is the single pass operation where the only significant venting of cooking vapor is through cooking vapor vent 83 which includes a damper 99 and an air blower, not shown, positioned upwardly from damper 99. Air is thus drawn upwardly through vent 83 and is exhausted and is not recirculated.

As the food 41 passes along the cooking chamber, it tends to draw heat out of the cooking vapors 21. Thus, although the temperature may be as high as 1000 to 1600 degrees Fahrenheit near the product feed end of the cooking chamber, it decreases along the chamber. For example, it may drop to 800, 600, 400 and 300 degrees in some instances, along the chamber so that as the food warms, the cooking temperature difference between the product and the cooking vapors 21 decreases. This characteristic optimizes the cooking operation and reduces the possibility of overcooking in a manner not possible in the typical oven or a recirculating oven which remains at a relatively constant temperature.

Figure 5:
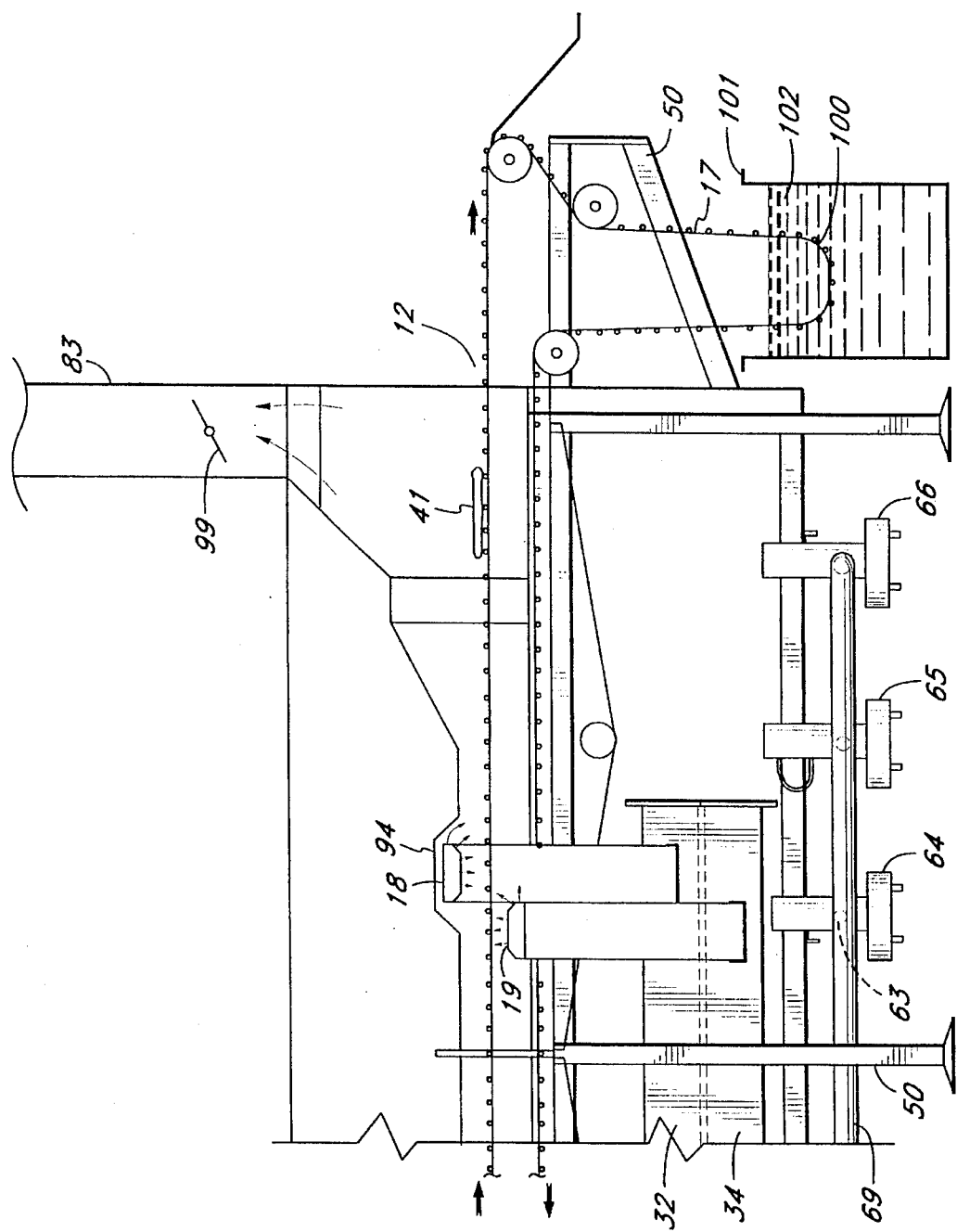
FIG. 5 is an enlarged cross sectional view of the product discharge end of the oven of FIG. 1.

Also shown in FIG. 5 is a belt cleaning loop 100 which causes the belt to pass through a tank 101 filled with water 102. It has been found that the belt remains relatively clean during most cooking operations. If it is desired to add non-stick coatings to the belt, they can be added to tank 102.

Figure 8:
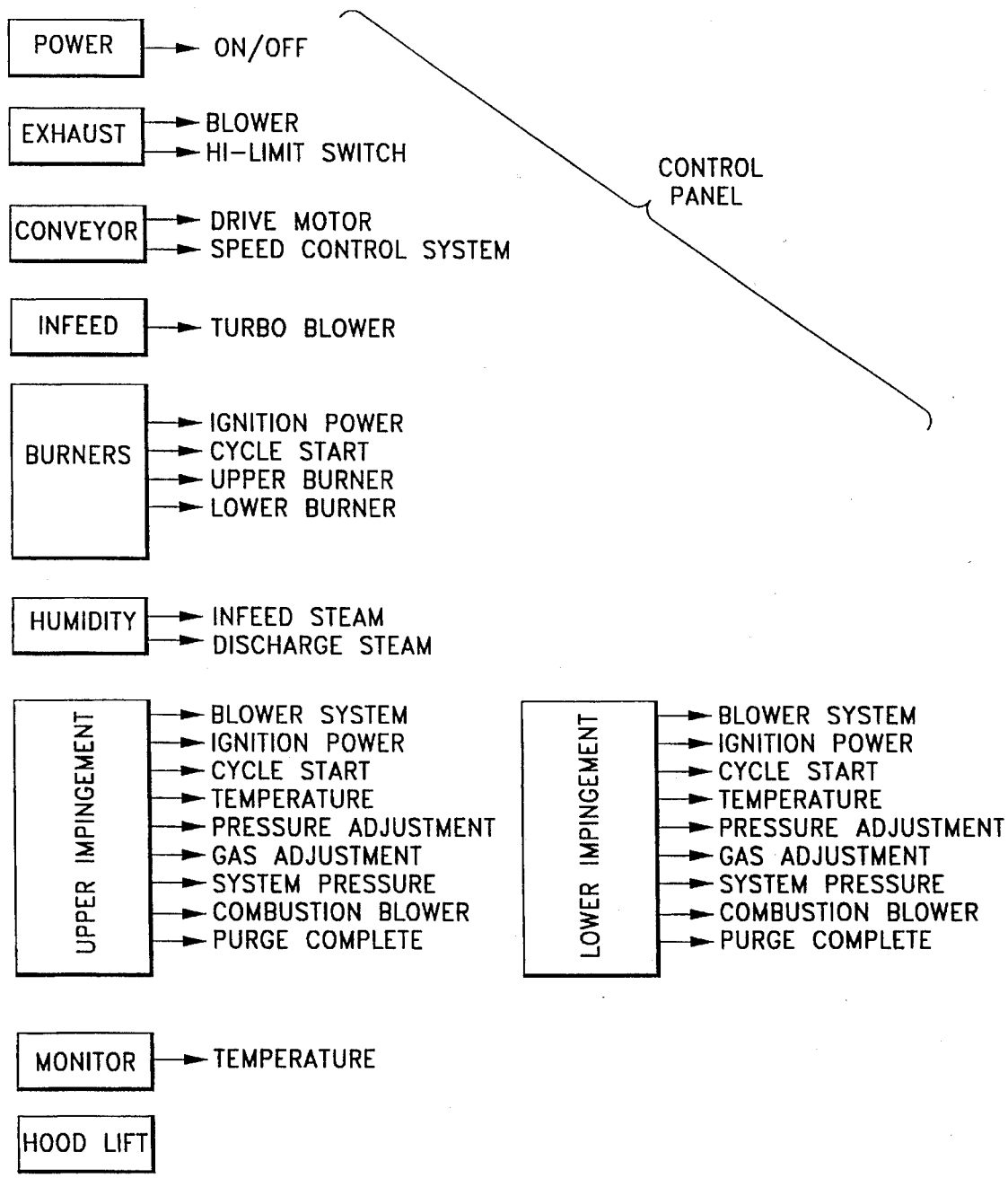
FIG. 8 is a diagrammatic view of the control panel of FIG. 7.

Control panel 103 is shown in FIGS. 7 and 8. The cooking unit is provided with numerous means for controlling temperature, air flow, humidity, and belt speed. Appropriate monitoring units such as pressure sensing means, thermocouples and other sensors provide input to the control panel for facilitating the operation of the unit. The controls are more specifically set forth in FIG. 8. Particular note is made of the wide variety of controls available on both the upper impingement unit and the lower impingement unit The result is a highly versatile and yet efficient continuous convection/impingement cooking oven which is capable of placing the optimum temperature, time and humidity together with upper and lower air flow impingement on the food to be cooked so that the best possible product will result.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A process for continuously cooking foodstuff while being above to provide excellent control of the properties of the cooked foodstuff, said process comprising the steps of:

placing a foodstuff to be cooked on an upper surface of a perforate, moving belt;

heating at least one surface of the foodstuff to be cooked with a color development and sealing flame;

aiming said color development and sealing flame so that the heat therefrom passes into the entrance of an elongated cooking chamber surrounding said moving belt, said cooking chamber having a product feed and a product discharge;

passing said foodstuff to be cooked through a plurality of cooking phase assemblies to produce cooking vapors and moving the cooking vapors concurrently along said elongated cooking chamber without any recirculation of the cooking vapors, and said cooking vapors increasing in velocity along said cooking chamber as the foodstuff to be cooked moves from the product feed to the product discharge;

venting said cooking vapors from said cooking chamber near the product discharge; and removing the resulting cooked product from the moving belt.

2. The process of claim 1 further including the step of:

introducing steam above and below said foodstuff to be cooked after said foodstuff has passed said color development and sealing flame.

3. The process of claim 2 further including the step of:

impinging the upper surface of said foodstuff to be cooked with hot air from above said moving belt at a second temperature and velocity, said introducing step and said two impinging steps forming a cooking phase assembly and each of said cooking phase assemblies producing cooking vapors.

* * * * *